Patented Mar. 26, 1935

1,996,006

UNITED STATES PATENT OFFICE 1,996,006

2-CHLORO-6-NITROBENZALDIMER-CURIOXIDE

Emeric Havas, South Milwaukee, Wis., assignor to E. I. du Pont de Nemours & Company, Wilmington, Del., a corporation of Delaware No Drawing. Application July 27, 1933, Serial No. 682,426

4 Claims. (Cl. 260—13)

This invention relates to the preparation of a new mercury compound of 2-chloro-6-nitrotoluene.

The object of this invention is to produce a mercury compound of 2-chloro-6-nitrotoluene which can be readily converted into 2-chloro-6-nitrobenzaldoxime by simple and economical procedure.

I have found that by reacting 2-chloro-6-nitrotoluene with mercuric oxide in dilute alkaline solution, a dimercury oxide omega substitution product is obtained in good yields which can be readily and economically converted into 2-chloro-6-nitrobenzaldoxime without the production of any material amount of by-products.

While Reissert in Berichte 40 pages 4209–4226 has described the preparation of a similar compound from o-nitrotoluene, it was not to be expected that 2-chloro-6-nitrotoluene would react with mercuric oxide to give a compound that could be converted into the corresponding aldoxime, for as disclosed by Reissert, even p-nitrotoluene and 2-4 dinitrotoluene do not react in the same manner as o-nitrotoluene to give the aldoximes.

The following example will serve to illustrate a preferred method for preparing this new compound. The parts given are by weight.

Example.—441 parts of pure freshly precipitated yellow mercuric oxide are stirred with 5000 parts of water and 88 parts of flaked caustic soda and heated to boil under a reflux condenser. 171.5 parts of 2-chloro-6-nitrotoluene are added in small amounts over a period of twelve hours while the temperature is maintained at about 95 to 99° C. with continuous agitation. After the addition is completed the mass is heated at 95 to 99° C. for twelve hours or until all of the chloro-nitrotoluene has been reacted. The mass is then cooled, filtered and the resulting solid dried at a low temperature. The product obtained when dry is an orange yellow powder, stable at ordinary temperatures. On heating it is decomposed. The product is believed to be 2-chloro-6-nitrobenzaldimercurioxide of the following probable formula:

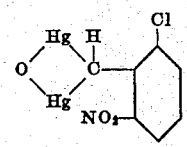

The amount of water and quantity of caustic soda used may vary within reasonable limits. The mass must be distinctly alkaline but too much alkali is to be avoided since it tends to retard the speed of the reaction. Sufficient water should be used to keep the solids suspended in a finely divided form. The caustic soda may be replaced by similar alkaline agents such as potassium or barium hydroxide.

If an excess of mercuric oxide is used, it only remains in the final product unchanged, while an excess of 2-chloro-6-nitrotoluene tends to make the product sticky and makes purification necessary. While the reaction may be carried out at reflux temperatures, those above given are preferred. Lower temperatures materially lengthen the time of the reaction. Increased pressure may be used to permit the use of higher temperatures and thus shorten the time of reaction.

I claim:

1. As a new product, 2-chloro-6-nitrobenzaldimercurioxide, obtainable by reacting 2-chloro-6-nitrotoluene with mercuric oxide in alkaline solution, said product when dry being an orange yellow powder, stable at ordinary temperatures, decomposable by heat and having the following probable formula:

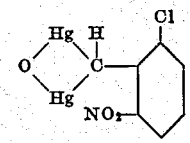

2. In the process for preparing a mercury substitution product of 2-chloro-6-nitrotoluene the step which comprises reacting 2-chloro-6-nitrotoluene with mercuric oxide in alkaline solution.

3. The process which comprises reacting 2-chloro-6-nitrotoluene with pure freshly precipitated mercuric oxide in the molar ratio of 1:2 in dilute alkaline solution at a temperature of from about 95° C. to about 99° C.

4. In the process for preparing a mercury substitution product of 2-chloro-6-nitrotoluene, the steps which comprise heating 441 parts of freshly precipitated yellow mercuric oxide in approximately 5000 parts of water and about 88 parts of caustic soda and slowly adding thereto about 171 parts of 2-chloro-6-nitrotoluene while maintaining a temperature of 95 to 99° C.

EMERIC HAVAS.